(12) United States Patent
Vedantham et al.

(10) Patent No.: US 7,746,882 B2
(45) Date of Patent: Jun. 29, 2010

(54) METHOD AND DEVICE FOR ASSEMBLING FORWARD ERROR CORRECTION FRAMES IN MULTIMEDIA STREAMING

(75) Inventors: Ramakrishna Vedantham, Sunnyvale, CA (US); Vidya Setlur, Cupertino, CA (US); Suresh Chitturi, Irving, TX (US)

(73) Assignee: Nokia Corporation, Espoo (FI)

( * ) Notice: Subject to any disclaimer, the term of this patent is extended or adjusted under 35 U.S.C. 154(b) by 673 days.

(21) Appl. No.: 11/508,726

(22) Filed: Aug. 22, 2006

(65) Prior Publication Data
US 2008/0049789 A1     Feb. 28, 2008

(51) Int. Cl.
*H04J 3/24* (2006.01)
(52) U.S. Cl. ...................................... 370/414
(58) Field of Classification Search ........................ None
See application file for complete search history.

(56) References Cited

U.S. PATENT DOCUMENTS

| | | | |
|---|---|---|---|
| 2006/0107187 A1 | 5/2006 | Hannuksela | 714/776 |
| 2006/0107189 A1 | 5/2006 | Wenger et al. | 714/776 |
| 2006/0109805 A1* | 5/2006 | Malamal Vadakital et al. | 370/299 |
| 2008/0008190 A1* | 1/2008 | Elstermann | 370/395.41 |

OTHER PUBLICATIONS

Tian et al, Improved H.264 AVC video broadcast/multicast, In: Li, S. et al. (Eds.). Visual Communications and Image Processing 2005, VCIP 2005, Beijing, China, Jul. 12-15, 2005, Proceedings of SPIE, pp. pp. 71-82, 2005.*
Stockhammer et al, H.264/AVC in Wireless Environments, IEEE, 17 pages, 2003.*
Wenger et al, RTP Payload Format for H.264 Video, RFC 3984, 83 pages, Feb. 2005.*
Tian et al, Improved H.264 AVC video broadcastJmulticast, In: Li, S. et al. (Eds.). Visual Communications and Image Processing 2005, VCIP 2005, Beijing, China, Jul. 12-15, 2005, Proceedings of SPIE, pp. pp. 71-82, 2005.*

* cited by examiner

*Primary Examiner*—Frank Duong
(74) *Attorney, Agent, or Firm*—Ware, Fressola, Van Der Sluys & Adolphson LLP

(57) ABSTRACT

In a RTP stream having a plurality of FEC frames containing source blocks of media packets, random access points are inserted in front of the source blocks so as to allow a media decoder to decode the media packets as soon as FEC decoding is finished. In particular, the media packets contain forward error correction (FEC) source blocks for a multimedia broadcast/multicast-based streaming service content. As the multimedia broadcast/multicast streaming service includes dynamic interactive multimedia scene content where the source RTP packets of different media along with the FEC RTP packets are transmitted as separate RTP streams, the inclusion of the random access point facilitates immediate rendering of the dynamic interactive multimedia scene content after FEC decoding, thus reducing the tune-in latency.

7 Claims, 6 Drawing Sheets

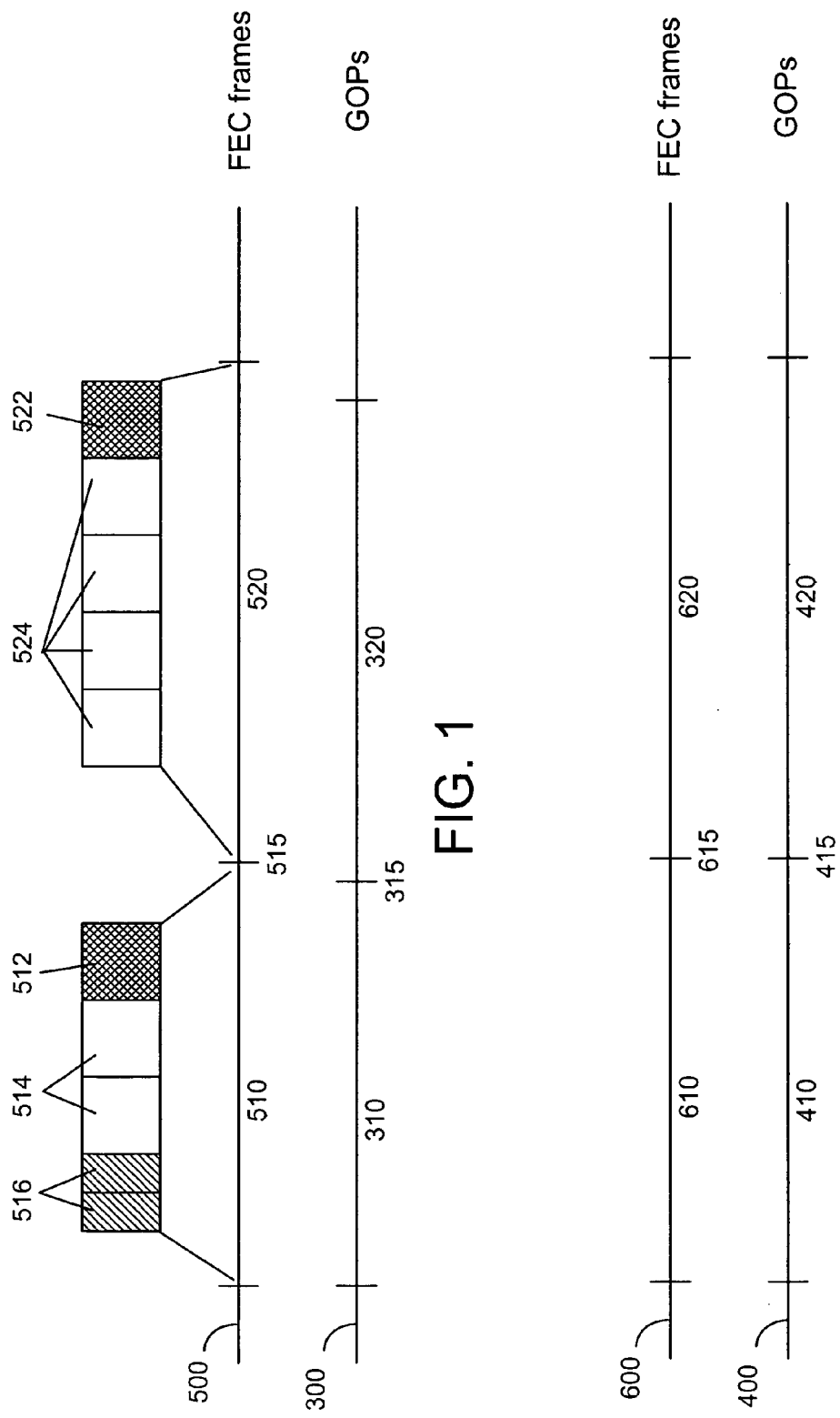

| Source block | RAP | FEC packets | FEC packets |

FIG. 5a

| Source block | RAP | Source block | RAP | FEC packets | FEC packets |

FIG. 5b

METHOD AND DEVICE FOR ASSEMBLING FORWARD ERROR CORRECTION FRAMES IN MULTIMEDIA STREAMING

FIELD OF THE INVENTION

The present invention relates generally to the assembly of forward error correction frames for groups of coded media packets and, more particularly, to the forward error correction frames in multimedia streaming.

BACKGROUND OF THE INVENTION

Most packet based communication networks, especially Internet Protocol (IP) networks without guaranteed quality of service, suffer from a variable amount of packet losses or errors. Those losses can stem from many sources, for example router or transmission segment overload or bit errors in packets that lead to their deletion. It should be understood that packet losses are a common operation point in most packet networks architectures, and not a network failure. Media transmission, especially the transmission of compressed video, suffers greatly from packet losses.

Annoying artifacts in a media presentation resulting from errors in a media transmission can further be avoided by many different means during the media coding process. However, adding redundancy bits during a media coding process is not possible for pre-coded content, and is normally less efficient than optimal protection mechanisms in the channel coding using a forward error correction (FEC).

Forward Error Correction works by calculating a number of redundant bits over the to-be-protected bits in the various to-be-protected media packets, add those bits to FEC packets, and transmit both, the media packets and the FEC packets. At the receiver, the FEC packets can be used to check the integrity of the media packets and to reconstruct media packets that may be missing. Henceforth, the media packets and the FEC packets which are protecting those media packets will be called a FEC frame. Examples of the FEC frame are shown in FIG. 1. As shown in FIG. 1, a media GOP stream 300 comprises a media GOP 310 and a media GOP 320 separated by a boundary 315. The FEC structure 500 comprises a FEC frame 510 and a FEC frame 520 separated by a boundary 515. In addition to the media packets 514, the FEC frame 510 also contains an FEC packet 512 and two padding packets 516. Likewise, the FEC frame 520 contains an FEC packet in addition to the media packets 524. As such, the FEC frames 510, 520 are generally longer than the media GOPs. As such, the FEC frames are not aligned with the media GOPs.

Most FEC schemes intended for error protection allow selecting the number of to-be-protected media packets and the number of FEC packets to be chosen adaptively to select the strength of the protection and the delay constraints of the FEC subsystem.

Packet based FEC in the sense discussed above requires a synchronization of the receiver to the FEC frame structure, in order to take advantage of the FEC. That is, a receiver has to buffer all media and FEC packets of a FEC frame before error correction can commence.

Video coding schemes, and increasingly some audio coding schemes, for example, use so-called predictive coding techniques. Such techniques predict the content of a later video picture or audio frame from previous pictures or audio frames, respectively. In the following, video pictures and audio frames will both be referred to as "pictures", in order to distinguish them from FEC frames. By using predictive coding techniques, the compression scheme can be very efficient, but becomes also increasingly vulnerable to errors the longer the prediction chain becomes. Hence, so-called key pictures, or the equivalent of non-predictively coded audio frames, both referred to as key pictures hereinafter, are inserted from time to time. This technique re-establishes the integrity of the prediction chain by using only non-predictive coding techniques. It is not uncommon that a key pictures is 5 to 20 times bigger than a predictively coded picture. Each encoded picture may correspond, for example, to one to-be-protected media packet.

Following the conventions of MPEG-2 visual, the picture sequence starting with a key picture and followed by zero or more non-key pictures is henceforth called Group of Pictures (GOP). In digital TV, a GOP consists normally of no more than six pictures. In streaming applications, however, GOP sizes are often chosen much bigger. Some GOPs can have hundred of pictures in a GOP in order to take advantage of the better coding efficiency of predictively coded pictures. For that reason, the "tune in" to such a sequence can take several seconds.

FEC schemes can be designed to be more efficient when FEC frames are big in size, for example, when they comprise some hundred packets. Similarly, most media coding schemes gain efficiency when choosing larger GOP sizes, since a GOP contains only one single key picture which is, statistically, much larger than the other pictures of the GOP. However, both large FEC frames and large GOP sizes are required to synchronize to their respective structures. For FEC frames this implies buffering of the whole FEC frame as received, and correcting any correctable errors. For media GOPs this implies the parsing and discarding of those media packets that do not form the start of a GOP (the key frame).

In U.S. Patent Application Publication No. 2006/0107189 A1, it is stated that, in order to reduce a buffer delay at a decoding end, the FEC frames should be aligned with the groups of media packets. To that end, the encoder should be able to determine, for a group of coded media packets contained in an FEC frame, the number of next subsequent groups of coded media packets which fit completing into that FEC frame, and to select all coded media packets associated with the group or groups of coded media packets so determined for that FEC frame. For alignment purposes, it is possible to equalize the size of selected packets by adding predetermined data to some of them. Examples of aligned FEC frames and the groups of media packets are shown in FIG. 2. As shown in FIG. 2, a media GOP stream 400 comprises a media GOP 410 and a media GOP 420 separated by a boundary 415. The FEC structure 600 comprises a FEC frame 610 and a FEC frame 620 separated by a boundary 615. Although the FEC frames 610 and 620 also contain FEC packets and the media packets, they can be made aligned with the GOPs.

FEC can be applied to rich media content. Rich media content is generally referred to content that is graphically rich and contains compound (or multiple media) including graphics, text, video and audio and preferably delivered through a single interface. Rich media dynamically changes over time and could respond to user interaction.

Streaming of rich media content is becoming more and more important for delivering visually rich content for real-time transport especially within the Multimedia Broadcast/Multicast Services (MBMS) and Packet-switched Streaming Services (PSSS) architectures in 3GPP. PSS provides a framework for Internet Protocol (IP) based streaming applications in 3G networks, especially over point-to-point bearers. MBMS streaming services facilitate resource efficient delivery of popular real-time content to multiple receivers in a 3G mobile environment. Instead of using different point-to-point (PtP) bearers to deliver the same content to different mobiles, a single point-to-multipoint (PtM) bearer is used to deliver the same content to different mobiles in a given cell. The streamed content may consist of video, audio, XML (eXtensible Markup Language) content such as Scalable Vector Graphics (SVG), timed-text and other supported media. The content may be pre-recorded or generated from a live feed. SVG allows for three types of graphic objects: vector graphic shapes, image and texts. Graphic objects can be grouped, transformed and composed from previously rendered objects. SVG content can be arranged in groups such that each of them can be processed and displayed independently from groups that are delivered later in time. Groups are also referred to as scenes.

Until recently, applications for mobile devices were text based with limited interactivity. However, as more wireless devices are coming equipped with color displays and more advanced graphics rendering libraries, consumers will demand a rich media experience from all their wireless applications. A real-time rich media content streaming service is imperative for mobile terminals, especially in the area of MBMS, PSS, and Multi-Media Streaming (MMS) services. Rich media applications particularly in the Web services domain include XML based content such as:

SVGT 1.2—is a language for describing two-dimensional graphics in XML. SVG allows for three types of graphic objects: vector graphic shapes (e.g., paths consisting of straight lines and curves), multimedia (such as raster images, video, video), and text. SVG drawings can be interactive (using DOM event model) and dynamic. Animations can be defined and triggered either declaratively (i.e., by embedding SVG animation elements in SVG content) or via scripting. Sophisticated applications of SVG are possible by use of a supplemental scripting language which accesses the SVG Micro Document Objects Module (µDOM), which provides complete access to all elements, attributes and properties. A rich set of event handles can be assigned to any SVG graphical object. Because of its compatibility and leveraging of other Web standards (such as CDF), features like scripting can be done on XHTML (Extensible HyperText Markup Language) and SVG elements simultaneously within the same Web page.

SMIL 2.0—The Synchronized Multimedia Integration Language (SMIL) enables simple authoring of interactive audio-visual presentations. SMIL is typically used for "rich media"/multimedia presentations which integrate streaming audio and video with images, text or any other media type.

CDF—The Compound Documents Format (CDF) working group is producing recommendations on combining separate component languages (e.g. XML-based languages, elements and attributes from separate vocabularies), like XHTML, SVG, MathML, and SMIL, with a focus on user interface markups. When combining user interface markups, specific problems have to be resolved that are not addressed by the individual markups specifications, such as the propagation of events across markups, the combination of rendering or the user interaction model with a combined document. The Compound Document Formats working group will address this type of problems. This work is divided in phases and two technical solutions: combining by reference and by inclusion.

In the current 3GPP DIMS (Dynamic Interactive Multimedia Scenes) activity, the streaming of DIMS content has been recognized as an important component of a dynamic rich media service for enabling real time, continuous realization of content at the client. A DIMS content stream typically consists of a series of RTP (Real-time Transport Protocol) packets whose payload is SVG scene, SVG scene update(s), and coded video and audio packets. These RTP packets are encapsulated by UDP (User Datagram Protocol)/IP headers and transmitted over the 3G networks. The packets may be lost due to transmission errors over the wireless links or buffer overflows at the intermediate routers of the 3G networks.

3GPP SA4 defined some media independent packet loss recovery mechanisms at transport layer and above in the MBMS and PSS frameworks. In MBMS, application layer FEC is used for packet loss recovery for both streaming and download services. In PSS, RTP layer retransmissions are used for packet loss recovery. For unicast download delivery, TCP (Transmission Control Protocol) takes care of the reliable delivery of the content.

For rich media based MBMS streaming services, it is very likely that the users tune-in to the service at arbitrary instants during the streaming session. The clients start receiving the packets as soon as they tune-in to the service and may have to wait for a certain time period to start decoding/rendering of the received rich media content. This time period is also called "tune-in delay". For good user experience, it is desirable that the clients start rendering the content as soon as possible from the time they receive the content. Thus one requirement of DIMS is to allow for efficient and quick tune-in of DIMS clients to the broadcast/multicast streaming service. Quick tune-in can be enabled by media level solutions, transport level solutions or a combination of the two.

When streaming rich media (DIMS) content over broadcast/multicast channels of the 3G wireless networks, it is essential to protect the content from packet losses by using application layer forward error correction (AL-FEC) mechanism. AL-FEC algorithm is typically applied over a source block of media RTP packets to generate redundant FEC RTP packets. As mentioned earlier and illustrated in FIGS. 1 and 2, the media and the associated FEC packets are collectively referred to as an "FEC frame". The FEC frame is transmitted over the lossy network. A receiver would be able to recover any lost media RTP packets if it receives sufficient total number of media and FEC RTP packets from that FEC frame. Currently, the length of the above-mentioned source block is configurable. AL-FEC is more effective if large source blocks are used. On the other hand, the tune-in delay is directly proportional to the length of the source block.

In a typical rich media streaming session that involves SVG, audio and video media, at the sender side, source RTP packets of each media are bundled together to form a source block for FEC protection. One or more FEC RTP packets are generated from this source block using an FEC encoding algorithm. The source RTP packets of different media along with the FEC RTP packets are transmitted as separate RTP streams, as shown in FIG. 3. As shown in FIG. 3, the DIMS RTP stream contains a plurality of FEC frames $610_1$, $610_2$ and $610_3$, for example. These FEC frames may contain the source blocks for different DIMS media or the same medium. The FEC frame $610_1$ comprises a source block $614_1$ of source RTP packets and a FEC RTP packet $612_1$. On the receiver side, the client buffers the received RTP packets (both source and FEC) for sufficient duration and tries to reconstruct the above mentioned source block. If any source RTP packets are missing, then it tries to recover them by applying the FEC decoding algorithm.

The length of the FEC source block is a critical factor in determining the tune-in delay. The client has to buffer for the duration of an entire FEC source block. If a client starts receiving data in the middle of the current FEC source block, then it may have to discard the data from the current source block, and wait to receive next source block from the beginning to the end. Hence on an average it has to wait for 1.5 times the FEC source block duration.

After FEC decoding, the packets are sent to various media decoders at the receiver. The media decoders may not be able to decode from arbitrary points in the compressed media bit stream. If the FEC frames and the media GOPs are not aligned, then on an average the decoder may have to discard one half of the current media GOP data.

$$\text{Tune-in delay} = 1.5*(\text{FEC source block duration}) + 0.5* \\ (\text{media GOP duration}) \quad (1),$$

where FEC source block duration is the buffering delay of the FEC frame (in isochronous networks this is proportional to the size of the FEC frame), and media GOP duration is the buffering delay of the media GOP. The worst case buffer sizes have to be chosen such that a complete FEC frame and a complete GOP, respectively, fits into the buffer of an FEC decoder and the buffer of a media decoder, respectively.

SUMMARY OF THE INVENTION

The present invention provides a method and device wherein a random access point is inserted at the beginning of each forward error correction (FEC) source block for a multimedia broadcast/multicast-based streaming service content. As such, the media decoder can start decoding as soon as FEC decoding is finished and the second term in Equation 1 can be eliminated, thus reducing the tune-in delay. The multimedia broadcast/multicast streaming service includes dynamic interactive multimedia scene content where the source RTP packets of different media along with the FEC RTP packets are transmitted as separate RTP streams. The inclusion of the random access point facilitates immediate rendering of the dynamic interactive multimedia scene content after FEC decoding, thus reducing the tune-in latency.

Thus, the first aspect of the present invention is a method for use in multimedia streaming wherein a packet stream is provided to a multimedia client capable of decoding media packets of a plurality of media, and the encoded media packets of each medium are arranged in frames, each frame having at least a source block following at least one forward error correction packet. The method comprises inserting a random access point in at least some of the frames such that the random access point is located between the source block and the forward error correction packet.

The second aspect of the present invention is a module for use in a server in multimedia streaming wherein a packet stream is provided from the server to a multimedia client capable of decoding media packets of a plurality of media, and the encoded media packets of each medium are arranged in frames, each frame having at least a source block following at least one forward error correction packet. The module is adapted for inserting a random access point in at least some of the frames such that the random access point is located between the source block and the forward error correction packet.

The third aspect of the present invention is a server in a communication system, the communication system comprising one or more multimedia clients capable of decoding media packets of a plurality of media, and the encoded media packets of each medium are arranged in frames, each frame having at least a source block following at least one forward error correction packet. The server comprises a generation module for inserting a random access point in at least some of the frames such that the random access point is located between the source block and the forward error correction packet.

The fourth aspect of the present invention is a multimedia client adapted for receiving a multimedia bitstream, the bitstream comprising a plurality of encoded media packets arranged in frames, each frame having at least a source block following at least one forward error correction packet and wherein at least one random access point is inserted between the source block and the forward correction packet. The client comprises a first decoder for forward error correction decoding and at least one media decoder for decoding the source block of encoded media packets after the forward error correction decoding based on the random access point.

The fifth aspect of the present invention is a software application product comprising a storage medium having a software application for use in multimedia streaming wherein a packet stream is provided to a multimedia client capable of decoding media packets of a plurality of media, and the encoded media packets of each medium are arranged in frames, each frame having at least a source block following at least one forward error correction packet. The software application comprises programming code for inserting a random access point in at least some of the frames such that the random access point is located between the source block and the forward error correction packet.

The sixth aspect of the present invention is a software application product comprising a storage medium having a software application for use in a multimedia client, the client adapted for receiving a multimedia bitstream, the bitstream comprising a plurality of encoded media packets arranged in frames, each frame having at least a source block following at least one forward error correction packet and wherein at least one random access point is inserted between the source block and the forward correction packet. The software application comprises programming code for forward error correction decoding and programming code for decoding the source block of encoded media packets after the forward error correction decoding based on the random access point.

The present invention will become apparent upon reading the description taken in conjunction with FIGS. 1 to 7.

BRIEF DESCRIPTION OF THE DRAWINGS

FIG. 1 is a timing diagram showing a plurality of GOPs and the associated FEC frames which are not aligned with the GOPs.

FIG. 2 is a timing diagram showing a plurality of GOPs and the associated FEC frames which are aligned with the GOPs.

FIG. 5a shows an FEC frame structure for DIMS, according to one embodiment of the present invention.

FIG. 5b shows an FEC frame structure for DIMS, according to another embodiment of the present invention.

DETAILED DESCRIPTION OF THE INVENTION

In streaming of rich media content, the streamed content may consist of video, audio, XML content such as SVG, time-text and other support media. An SVG stream generally consists of a scene and a series of scene updates. It is possible to consider the SVG scene as a starting point for decoding in an SVG decoder at the receiver after FEC decoding.

Figure 3:
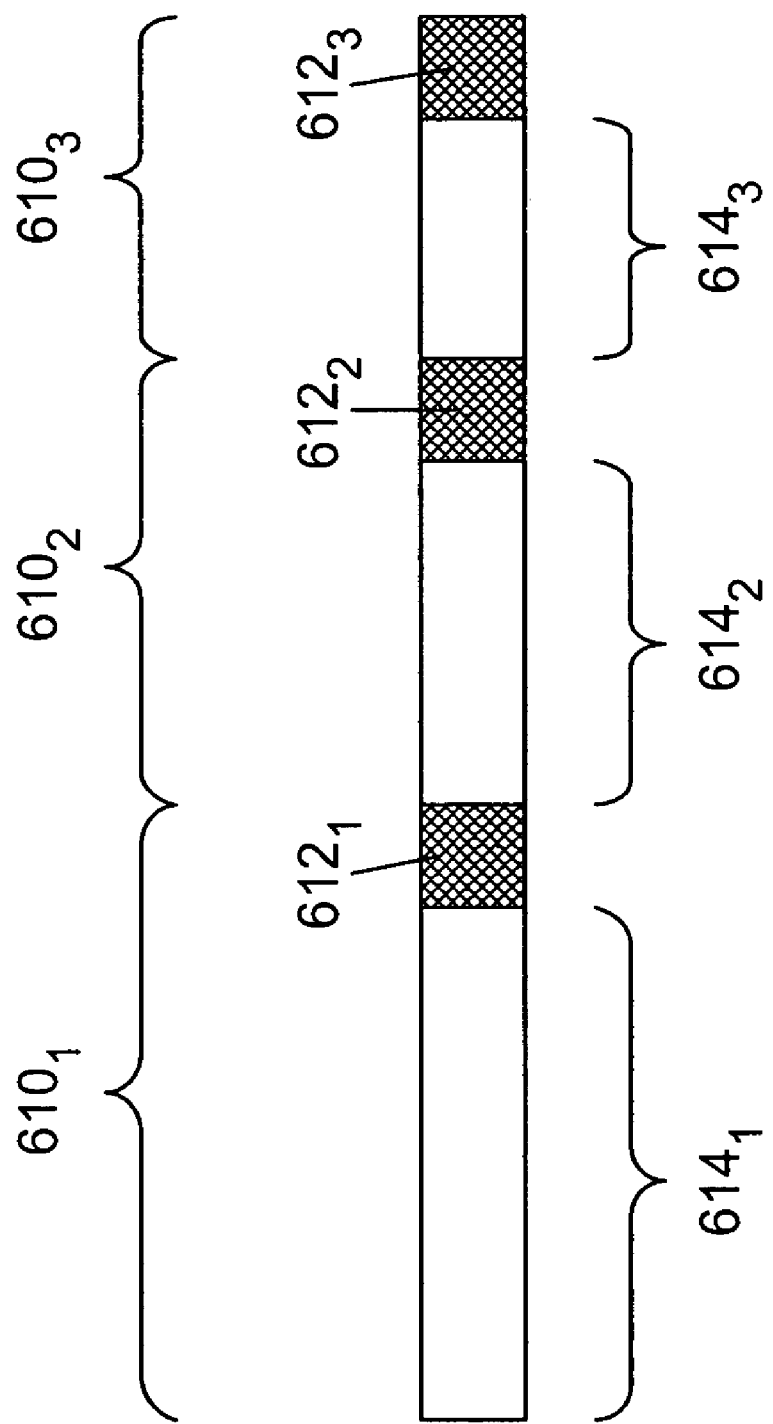
FIG. 3 shows the FEC frames in multimedia streaming.
Figure 4:
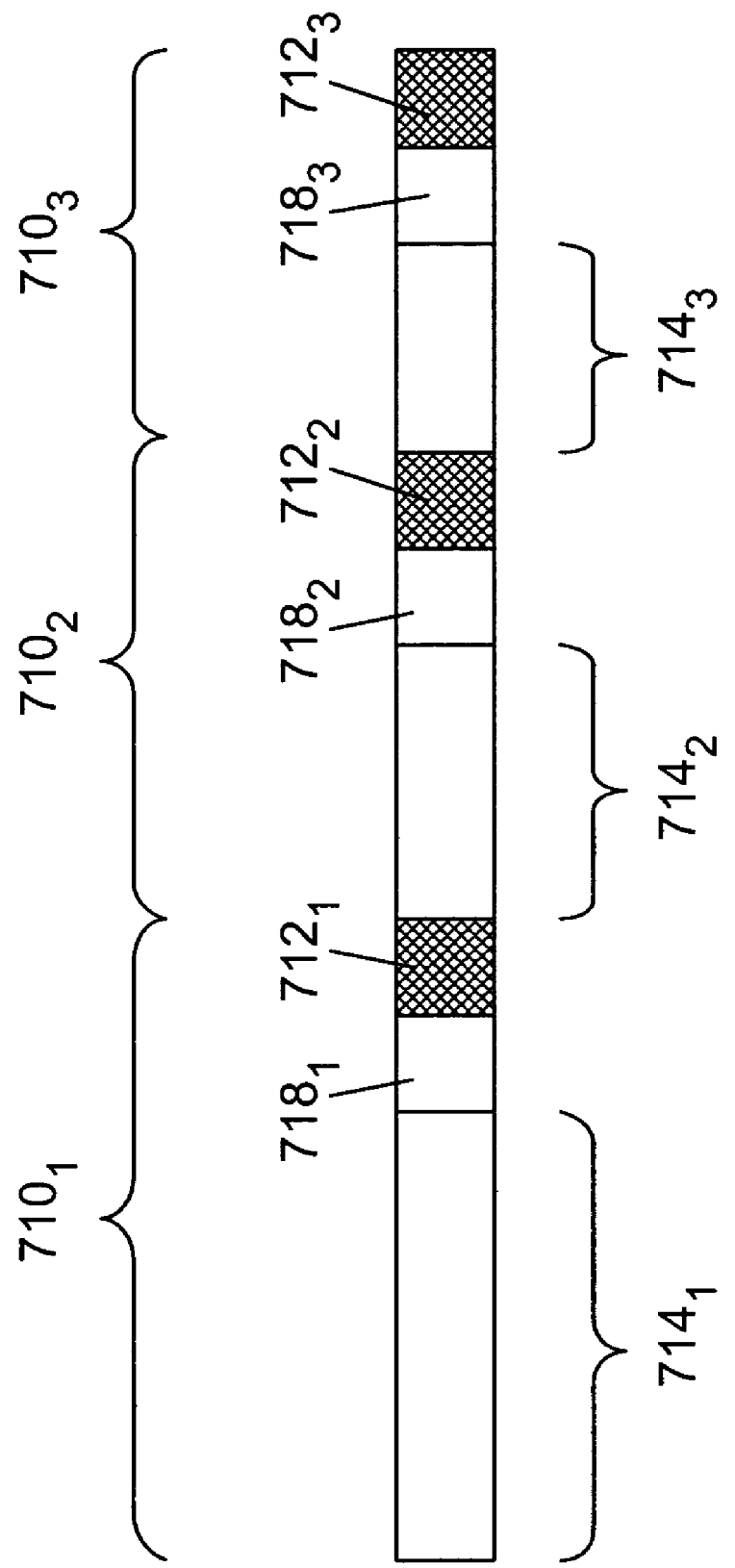
FIG. 4 shows the insertion of a random access point at the beginning of each FEC source block for multimedia streaming, according to one embodiment of the present invention.

According to present invention, it is advantageous to insert a random access point where a starting point for decoding is possible at a media decoder at the receiver after FEC decoding. In addition to inserting a random access point at the beginning of each FEC source block for an XML stream such as SVG, it is advantageous to insert a random access point at the beginning of each FEC source block for the video stream and at the beginning of each FEC source block for the audio. The current MBMS FEC framework uses media bundling for FEC protection purposes. i.e., the same FEC frame contains all types of media RTP packets (e.g., SVG, audio, video). In such arrangement, it is advantageous to have the random access points of the three media (in any order) at the beginning of the FEC frame. Such an inclusion of the random access point facilitates immediate rendering of the DIMS content after FEC decoding. FIG. 4 shows the insertion of a random access point at the beginning of each source block of an FEC frame. As shown in FIG. 4, a DIMS RTP stream comprises FEC frames $710_1$, $710_2$ and $710_3$, for example. These FEC frames may contain source blocks for different DIMS media such as video, audio, and timed text, or for the same medium. The FEC frame $710_1$ comprises a source block $714_1$ of source RTP packets, a random access point $718_1$ and a FEC RTP packet $712_1$. The FEC frame $710_2$ comprises a source block $714_2$ of source RTP packets, a random access point $718_2$ and a FEC RTP packet $712_2$. The FEC frame $710_3$ comprises a source block $714_3$ of source RTP packets, a random access point $718_3$ and a FEC RTP packet $712_3$.

It should be noted that an FEC frame can have more than one FEC packets so that the media bitstream is more robust against packet loss. Furthermore, while it is natural to have one random access point after the FEC packet or packets, as shown in FIG. 5a, it is also possible to have more than one random access points in one FEC frames to signal a scene change, as shown in FIG. 5b. The FEC packets are normally at the end of the FEC frame, while the RAP packets are at the beginning of the FEC frame. A random access point in the middle of an FEC frame is useful for quick tune-in. This is also useful in case of an FEC decoding failure. In such case, the first random access point is missing but the subsequent random access points in the same FEC frame can be used for media decoding.

There are several streaming-based use cases for assembling RAPs within FEC blocks for tune-in purposes. Some of which are part of a genre of Rich media services, including:

1) Interactive Mobile TV services—This service is understood as the ability to provide a deterministic rendering and behavior of Rich-media content including audio-video content, text, images, XML based content such as SVG, along with TV and radio channels, altogether in the end-user interface. The service provides convenient navigation through content in a single application or service and allows synchronized interaction in local or in distant such as voting and personalization (e.g.: related menu or sub-menu, advertising and content in function of the end-user profile or service subscription).

This use case is described in 4 steps corresponding to 4 services and sub-services available in an iTV mobile service:

Mosaic menu: TV Channel landscape.

Electronic Program Guide and triggering of related iTV service.

iTV service.

Personalized Menu "sport news."

2) Live enterprise data feed—This service includes stock tickers that provide streaming of real-time quotes, live intraday charts with technical indicators, news monitoring, weather alerts, charts, business updates, etc.

3) Live Chat—The live chat service can be incorporated within a web cam or video channel, or a rich-media blog service. End-users can register, save their surname and exchange messages. Messages appear dynamically in the live chat service along with rich-media data provided by the end-user. The chat service can be either private or public in one or more multiple channels at the same time. End-users are dynamically alerted of new messages from other users. Dynamic updates of messages within the service occur without reloading a complete page.

Figure 6:
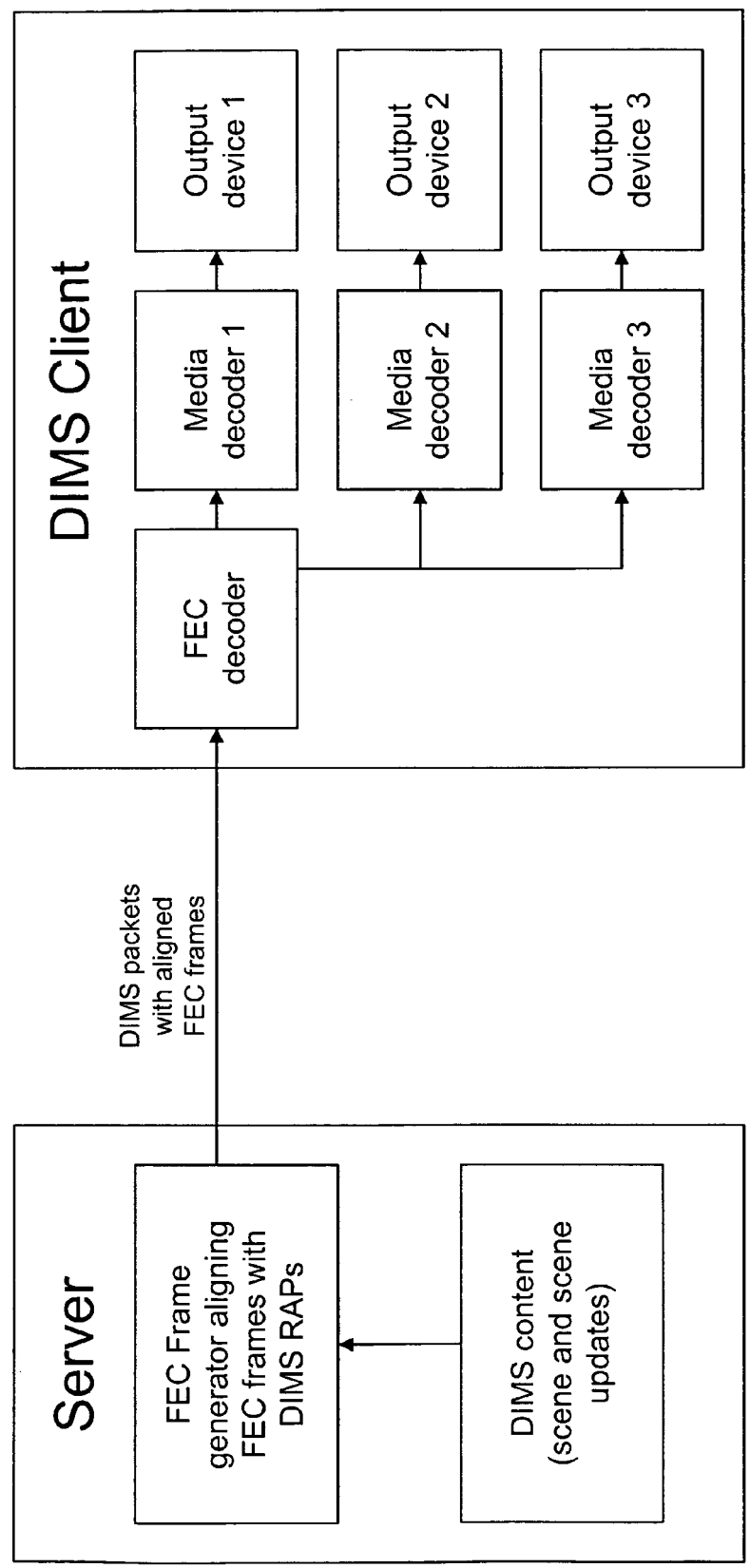
FIG. 6 is a schematic representation of a communication system having a server and a client wherein random access points are inserted in FEC frames.

4) Karaoke—This service displays a music TV channel or video clip catalog along with the speech of a song with fluid-like animation on the text characters to be singing (e.g. smooth color transition of fonts, scrolling of text). The end-user can download a song of his choice along with the complete animation by selecting an interactive button A schematic representation of a communication system having a server and a client, according to an embodiment of the present invention, is shown in FIG. 6. As shown in FIG. 6, the communication system is capable of providing multimedia/multicast services. Thus, the communication system has at least one server and one client for multimedia streaming. In particular, the server is adapted for providing Rich media (DIMS) content over broadcast/multicast channels of a wireless network, such as the Internet. In particular, the server is adapted for acquiring, receiving and/or storing DIMS content. For examples, the DIMS content includes scenes and scene updates. The DIMS content can be conveyed to an FSC frame generator which is adapted to insert random access points are inserted in FEC frames. More specifically, the random access points are inserted at the beginning of a source block for an MBMS-based streaming service for DIMS content. Advantageously, the FEC generator is adapted to provide FEC frames aligned with the media DIMS packets with the random access points included. The DIMS packets with aligned FEC frames are transmitted in a bitstream over broadcast/multicast channels so as to allow one or more DIMS clients to receive and decode the bitstream. The FEC generator can have a processing component running a FEC encoding software having programming code for aligning the FEC frame as well as random access points insertion.

In general, each DIMS client has a FEC decoder for error correction purposes. The FEC decoder can have a processing component running a FEC decoding software. After FEC decoding, the DIMS contents are conveyed to a number of media decoders. The decoded content from each media decoder is provided to an output module. For example, if the media decoder is an video decoder, then the decoded content is provided to a screen for display. As shown in FIG. 6, three different media decodes and three corresponding output modules are shown. One of the output modules can be a renderer adapted for SVG drawings, for example. SVG drawings can be interactive and dynamic and can be used in animation, for example.

Figure 7:
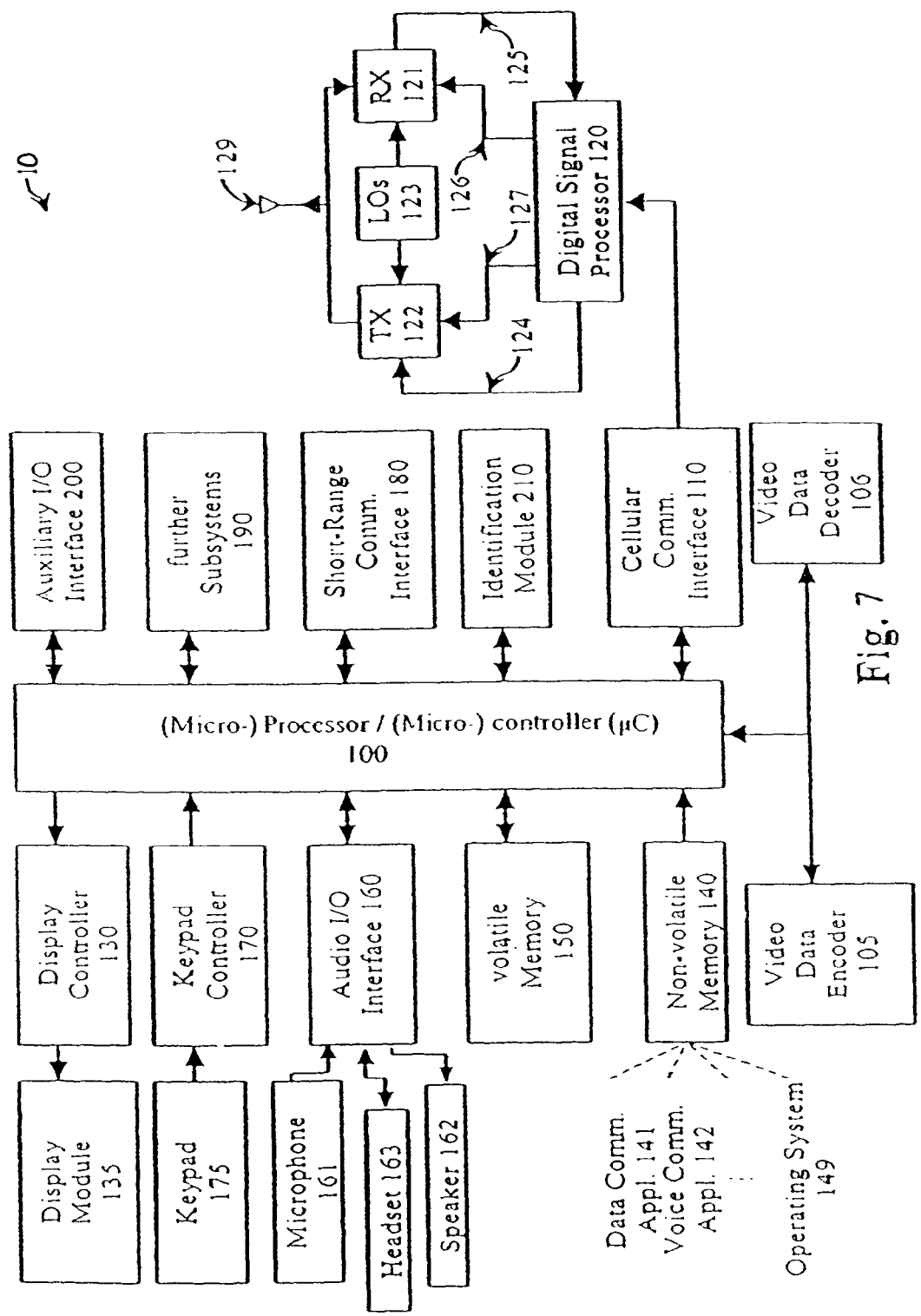
FIG. 7 is a block diagram of an electric device having at least one of the multimedia streaming encoder and the decoder, according to the present invention.

Referring now to FIG. 7, FIG. 7 shows an electronic device that equips at least one of the server module and the DIMS client module as shown in FIG. 6. According to one embodiment of the present invention, the electronic device is a mobile terminal. The mobile device 10 shown in FIG. 7 is capable of cellular data and voice communications. It should be noted that the present invention is not limited to this specific embodiment, which represents one of a multiplicity of different embodiments. The mobile device 10 includes a (main) microprocessor or micro-controller 100 as well as components associated with the microprocessor controlling the operation of the mobile device. These components include a display controller 130 connecting to a display module 135, a non-volatile memory 140, a volatile memory 150 such as a random access memory (RAM), an audio input/output (I/O) interface 160 connecting to a microphone 161, a speaker 162 and/or a headset 163, a keypad controller 170 connected to a keypad 175 or keyboard, any auxiliary input/output (I/O) interface 200, and a short-range communications interface 180. Such a device also typically includes other device subsystems shown generally at 190.

The mobile device 10 may communicate over a voice network and/or may likewise communicate over a data network, such as any public land mobile networks (PLMNs) in form of e.g. digital cellular networks, especially GSM (global system for mobile communication) or UMTS (universal mobile telecommunications system). Typically the voice and/or data communication is operated via an air interface, i.e. a cellular communication interface subsystem in cooperation with further components (see above) to a base station (BS) or node B (not shown) being part of a radio access network (RAN) of the infrastructure of the cellular network.

The cellular communication interface subsystem as depicted illustratively in FIG. 7 comprises the cellular interface 110, a digital signal processor (DSP) 120, a receiver (RX) 121, a transmitter (TX) 122, and one or more local oscillators (LOs) 123 and enables the communication with one or more public land mobile networks (PLMNs). The digital signal processor (DSP) 120 sends communication signals 124 to the transmitter (TX) 122 and receives communication signals 125 from the receiver (RX) 121. In addition to processing communication signals, the digital signal processor 120 also provides for the receiver control signals 126 and transmitter control signal 127. For example, besides the modulation and demodulation of the signals to be transmitted and signals received, respectively, the gain levels applied to communication signals in the receiver (RX) 121 and transmitter (TX) 122 may be adaptively controlled through automatic gain control algorithms implemented in the digital signal processor (DSP) 120. Other transceiver control algorithms could also be implemented in the digital signal processor (DSP) 120 in order to provide more sophisticated control of the transceiver 121/122.

In case the mobile device 10 communications through the PLMN occur at a single frequency or a closely-spaced set of frequencies, then a single local oscillator (LO) 123 may be used in conjunction with the transmitter (TX) 122 and receiver (RX) 121. Alternatively, if different frequencies are utilized for voice/data communications or transmission versus reception, then a plurality of local oscillators can be used to generate a plurality of corresponding frequencies.

Although the mobile device 10 depicted in FIG. 7 is used with the antenna 129 as or with a diversity antenna system (not shown), the mobile device 10 could be used with a single antenna structure for signal reception as well as transmission. Information, which includes both voice and data information, is communicated to and from the cellular interface 110 via a data link between the digital signal processor (DSP) 120. The detailed design of the cellular interface 110, such as frequency band, component selection, power level, etc., will be dependent upon the wireless network in which the mobile device 10 is intended to operate.

After any required network registration or activation procedures, which may involve the subscriber identification module (SIM) 210 required for registration in cellular networks, have been completed, the mobile device 10 may then send and receive communication signals, including both voice and data signals, over the wireless network. Signals received by the antenna 129 from the wireless network are routed to the receiver 121, which provides for such operations as signal amplification, frequency down conversion, filtering, channel selection, and analog to digital conversion. Analog to digital conversion of a received signal allows more complex communication functions, such as digital demodulation and decoding, to be performed using the digital signal processor (DSP) 120. In a similar manner, signals to be transmitted to the network are processed, including modulation and encoding, for example, by the digital signal processor (DSP) 120 and are then provided to the transmitter 122 for digital to analog conversion, frequency up conversion, filtering, amplification, and transmission to the wireless network via the antenna 129.

The microprocessor/micro-controller (μC) 110, which may also be designated as a device platform microprocessor, manages the functions of the mobile device 10. Operating system software 149 used by the processor 110 is preferably stored in a persistent store such as the non-volatile memory 140, which may be implemented, for example, as a Flash memory, battery backed-up RAM, any other non-volatile storage technology, or any combination thereof. In addition to the operating system 149, which controls low-level functions as well as (graphical) basic user interface functions of the mobile device 10, the non-volatile memory 140 includes a plurality of high-level software application programs or modules, such as a voice communication software application 142, a data communication software application 141, an organizer module (not shown), or any other type of software module (not shown). These modules are executed by the processor 100 and provide a high-level interface between a user of the mobile device 10 and the mobile device 10. This interface typically includes a graphical component provided through the display 135 controlled by a display controller 130 and input/output components provided through a keypad 175 connected via a keypad controller 170 to the processor 100, an auxiliary input/output (I/O) interface 200, and/or a short-range (SR) communication interface 180. The auxiliary I/O interface 200 comprises especially USB (universal serial bus) interface, serial interface, MMC (multimedia card) interface and related interface technologies/standards, and any other standardized or proprietary data communication bus technology, whereas the short-range communication interface radio frequency (RF) low-power interface includes especially WLAN (wireless local area network) and Bluetooth communication technology or an IRDA (infrared data access) interface. The RF low-power interface technology referred to herein should especially be understood to include any IEEE 801.xx standard technology, which description is obtainable from the Institute of Electrical and Electronics Engineers. Moreover, the auxiliary I/O interface 200 as well as the short-range communication interface 180 may each represent one or more interfaces supporting one or more input/output interface technologies and communication interface technologies, respectively. The operating system, specific device software applications or modules, or parts thereof, may be temporarily loaded into a volatile store 150 such as a random access memory (typically implemented on the basis of DRAM (direct random access memory) technology for faster operation). Moreover, received communication signals may also be temporarily stored to volatile memory 150, before permanently writing them to a file system located in the non-volatile memory 140 or any mass storage preferably detachably connected via the auxiliary I/O interface for storing data. It should be understood that the components described above represent typical components of a traditional mobile device 10 embodied herein in the form of a cellular phone. The present invention is not limited to these specific components and their implementation depicted merely for illustration and for the sake of completeness.

An exemplary software application module of the mobile device 10 is a personal information manager application providing PDA functionality including typically a contact manager, calendar, a task manager, and the like. Such a personal information manager is executed by the processor 100, may have access to the components of the mobile device 10, and may interact with other software application modules. For instance, interaction with the voice communication software application allows for managing phone calls, voice mails, etc., and interaction with the data communication software application enables for managing SMS (soft message service), MMS (multimedia service), e-mail communications and other data transmissions. The non-volatile memory 140 preferably provides a file system to facilitate permanent storage of data items on the device including particularly calendar entries, contacts etc. The ability for data communication with networks, e.g. via the cellular interface, the short-range communication interface, or the auxiliary I/O interface enables upload, download, and synchronization via such networks.

The application modules 141 to 149 represent device functions or software applications that are configured to be executed by the processor 100. In most known mobile devices, a single processor manages and controls the overall operation of the mobile device as well as all device functions and software applications. Such a concept is applicable for today's mobile devices. The implementation of enhanced multimedia functionalities includes, for example, reproducing of video streaming applications, manipulating of digital images, and capturing of video sequences by integrated or detachably connected digital camera functionality. The implementation may also include gaming applications with sophisticated graphics and the necessary computational power. One way to deal with the requirement for computational power, which has been pursued in the past, solves the problem for increasing computational power by implementing powerful and universal processor cores. Another approach for providing computational power is to implement two or more independent processor cores, which is a well known methodology in the art. The advantages of several independent processor cores can be immediately appreciated by those skilled in the art. Whereas a universal processor is designed for carrying out a multiplicity of different tasks without specialization to a pre-selection of distinct tasks, a multi-processor arrangement may include one or more universal processors and one or more specialized processors adapted for processing a predefined set of tasks. Nevertheless, the implementation of several processors within one device, especially a mobile device such as mobile device 10, requires traditionally a complete and sophisticated re-design of the components.

In the following, the present invention will provide a concept which allows simple integration of additional processor cores into an existing processing device implementation enabling the omission of expensive complete and sophisticated redesign. The inventive concept will be described with reference to system-on-a-chip (SoC) design. System-on-a-chip (SoC) is a concept of integrating at least numerous (or all) components of a processing device into a single high-integrated chip. Such a system-on-a-chip can contain digital, analog, mixed-signal, and often radio-frequency functions—all on one chip. A typical processing device comprises a number of integrated circuits that perform different tasks. These integrated circuits may include especially microprocessor, memory, universal asynchronous receiver-transmitters (UARTs), serial/parallel ports, direct memory access (DMA) controllers, and the like. A universal asynchronous receiver-transmitter (UART) translates between parallel bits of data and serial bits. The recent improvements in semiconductor technology cause very-large-scale integration (VLSI) integrated circuits to enable a significant growth in complexity, making it possible to integrate numerous components of a system in a single chip. With reference to FIG. 7, one or more components thereof, e.g. the controllers 130 and 170, the memory components 150 and 140, and one or more of the interfaces 200, 180 and 110, can be integrated together with the processor 100 in a signal chip which forms finally a system-on-a-chip (Soc).

Additionally, the device 10 is equipped with a module for scalable encoding 105 and scalable decoding 106 of video data according to the inventive operation of the present invention. By means of the CPU 100 said modules 105, 106 may individually be used. However, the device 10 is adapted to perform video data encoding or decoding respectively. Said video data may be received by means of the communication modules of the device or it also may be stored within any imaginable storage means within the device 10. Video data can be conveyed in a bitstream between the device 10 and another electronic device in a communications network.

A mobile terminal, according to the present invention, may be equipped with an encoder in a server or decoder in a DIMS client as described above. The mobile terminal may have both the encoder and the decoder.

This invention covers the inclusion of different variants of DIMS RAPs at the beginning of each FEC source block. The variants include:

An entire SVG scene.

A DIMS scene update that can replace the entire DOM tree on the client.

Redundant RAPs that comprise redundant SVG scenes with possible references to future scene updates. Such redundant RAPs may be ignored by the clients not requiring resynchonization.

Although the invention has been described with respect to one or more embodiments thereof, it will be understood by those skilled in the art that the foregoing and various other changes, omissions and deviations in the form and detail thereof may be made without departing from the scope of this invention.

What is claimed is:

1. A method for use in a multimedia streaming system comprising:

arranging at a server media packets for a dynamic interactive multimedia scene content in a plurality of frames, each frame comprising at least a source block of media packets and at least one forward error correction packet; and inserting a random access point for the dynamic interactive multimedia scene content at beginning of each source block, wherein the random access point is a scalable vector graphics scene.

2. A computer readable storage medium embodied with a software application for use in multimedia streaming for performing a method for use in multimedia streaming according to claim 1.

3. A server for streaming multimedia, comprising:
a first module for arranging encoded media packets for a dynamic interactive multimedia scene in frames, each frame having at least a source block of media packets and at least one forward error correction packet; and
a second module for inserting a random access point for the dynamic interactive multimedia scene content at beginning of each source block, wherein the random access point is a scalable vector graphics scene.

4. A communication system comprising:
a server according to claim 3; and
one or more multimedia clients adapted for receiving a multimedia bitstream, wherein the bitstream comprises a plurality of encoded media packets for a dynamic interactive multimedia scene content arranged in frames, each frame having at least a source block of media packets and at least one forward error correction packet, and at least one random access point for the dynamic interactive multimedia scene content inserted at beginning of each source block, wherein said at least one random access point is a scalable vector graphics scene, each client comprising:
    a first decoder for forward error correction decoding; and
    at least one media decoder for decoding the source block of encoded media packets after the forward error correction decoding based on the random access point.

5. A method of receiving a multimedia bitstream in a multimedia streaming client, comprising:
    receiving at the multimedia streaming client a random access point for a dynamic interactive multimedia scene content, wherein the bitstream comprises encoded media packets for the dynamic interactive multimedia scene content arranged in frames, each frame comprising at least a source block of media packets and at least one forward error correction packet, and wherein said random access point is located at beginning of each source block and is a scalable vector graphics scene;
    decoding the source block of the encoded media packets for said dynamic interactive multimedia scene content, and
    forward error correction decoding the bitstream, wherein the decoding of the source block is arranged to start as soon as the forward error correction decoding of a received frame is carried out.

6. A computer readable storage medium embodied with a software application for use in a multimedia client, for performing a method of receiving a multimedia bitstream according to claim 5.

7. A client adapted for receiving a multimedia bitstream, comprising:
    a first decoder for forward error correction decoding, wherein the bitstream comprises a plurality of encoded media packets for a dynamic interactive multimedia scene content arranged in frames, each frame having at least a source block of media packets and at least one forward error correction packet, and at least one random access point for the dynamic interactive multimedia scene content inserted at beginning at each source block, wherein said at least one random access point is a scalable vector graphics scene; and
    at least one media decoder for decoding the source block of encoded media packets after the forward error correction decoding based on the random access point, wherein the media decoder is adapted to receive a random access point for said dynamic interactive multimedia scene content at beginning of each source block.

* * * * *